(12) United States Patent
Wang et al.

(10) Patent No.: US 12,480,593 B2
(45) Date of Patent: Nov. 25, 2025

(54) DRIVING DEVICE AND VALVE

(71) Applicant: ZHEJIANG SANHUA AUTOMOTIVE COMPONENTS CO., LTD., Zhejiang (CN)

(72) Inventors: Lixin Wang, Zhejiang (CN); Haijun Zhu, Zhejiang (CN); Yun Wang, Zhejiang (CN); Long Lin, Zhejiang (CN); Wang Tu, Zhejiang (CN)

(73) Assignee: ZHEJIANG SANHUA AUTOMOTIVE COMPONENTS CO., LTD., Zhejiang (CN)

( * ) Notice: Subject to any disclaimer, the term of this patent is extended or adjusted under 35 U.S.C. 154(b) by 29 days.

(21) Appl. No.: 18/037,103

(22) PCT Filed: Jan. 17, 2022

(86) PCT No.: PCT/CN2022/072273
§ 371 (c)(1),
(2) Date: May 16, 2023

(87) PCT Pub. No.: WO2022/152287
PCT Pub. Date: Jul. 21, 2022

(65) Prior Publication Data
US 2023/0417338 A1    Dec. 28, 2023

(30) Foreign Application Priority Data

Jan. 18, 2021 (CN) .......................... 202110064098.7

(51) Int. Cl.
*F16K 31/04* (2006.01)
*H02K 7/116* (2006.01)
*H02K 11/215* (2016.01)

(52) U.S. Cl.
CPC .......... *F16K 31/046* (2013.01); *H02K 7/1166* (2013.01); *H02K 11/215* (2016.01)

(58) Field of Classification Search
CPC .................................................... F16K 31/046
See application file for complete search history.

(56) References Cited

U.S. PATENT DOCUMENTS

| 5,245,258 A | * | 9/1993 | Becker | ................. | H02K 11/215 |
| | | | | | 318/10 |
| 7,141,904 B2 | * | 11/2006 | Mirescu | ............... | H02K 11/215 |
| | | | | | 310/99 |

(Continued)

FOREIGN PATENT DOCUMENTS

| CN | 1736014 A | 2/2006 |
| CN | 103516141 A | 1/2014 |

(Continued)

OTHER PUBLICATIONS

International Search Report for PCT/CN2022/072273 mailed Mar. 22, 2022, ISA/CN.

(Continued)

*Primary Examiner* — Umashankar Venkatesan
(74) *Attorney, Agent, or Firm* — Yue (Robert) Xu; Apex Attorneys at Law, LLP

(57) ABSTRACT

Provided are a driving device and a valve, the driving device includes a motor and a transmission assembly; an output shaft of the motor is connected to the transmission assembly, and the transmission assembly includes a transmission member; the transmission member and the output shaft are fixed to or are limitedly cooperate with one another, and the output shaft may drive the transmission member to rotate; the transmission assembly further includes a magnetic element; and the driving device further includes a Hall element corresponding to the magnetic element; the transmission member includes a cylindrical portion, and the cylindrical portion is provided with a first hole passage; the first hole passage includes a first opening portion located on an outer wall portion of the cylindrical portion, and at least a part of (Continued)

the magnetic element passes through the first opening portion to extend into the first hole passage.

18 Claims, 6 Drawing Sheets

(56) References Cited

U.S. PATENT DOCUMENTS

| | | | | |
|---|---|---|---|---|
| 7,261,012 | B2* | 8/2007 | Meyer | G01P 3/487 |
| | | | | 74/421 A |
| 7,360,467 | B2* | 4/2008 | Segawa | H02K 7/1166 |
| | | | | 180/444 |
| 7,663,273 | B2* | 2/2010 | Shiino | B62D 5/064 |
| | | | | 310/68 B |
| 9,035,505 | B2* | 5/2015 | Akutsu | H02K 11/225 |
| | | | | 310/68 D |
| 11,052,938 | B2* | 7/2021 | Liu | F16D 3/78 |
| 11,465,671 | B2* | 10/2022 | Jordan | H02K 7/003 |
| 2002/0105740 | A1 | 8/2002 | Yamauchi | |
| 2006/0213484 | A1 | 9/2006 | Schmidt | |
| 2007/0283628 | A1 | 12/2007 | Gotou et al. | |
| 2013/0342086 | A1 | 12/2013 | Jang | |
| 2016/0241108 | A1* | 8/2016 | Kimura | H02P 6/16 |
| 2019/0283534 | A1 | 9/2019 | Jiang et al. | |

FOREIGN PATENT DOCUMENTS

| | | |
|---|---|---|
| CN | 107314782 A | 11/2017 |
| CN | 108132679 A | 6/2018 |
| CN | 209994245 U | 1/2020 |
| DE | 19848081 A | 3/2000 |
| JP | S6251957 U | 3/1987 |
| JP | H058111 U | 2/1993 |
| JP | 2002067805 A | 3/2002 |
| JP | 2006166603 A | 6/2006 |
| JP | 2007135387 A | 5/2007 |
| JP | 2009521632 A | 6/2009 |
| JP | 2010112414 A | 5/2010 |
| JP | 2015027200 A | 2/2015 |
| JP | 2017009312 A | 1/2017 |

OTHER PUBLICATIONS

The Japanese 1st Office Action issued on May 28, 2024 for JP2023-543214.

The European search report issued on Jun. 18, 2024 for E22739162.0.

* cited by examiner

DRIVING DEVICE AND VALVE

This application is the national phase of International Application No. PCT/CN2022/072273, titled "DRIVING DEVICE AND VAVLE", filed on Jan. 17, 2022, which claims priority to Chinese Patent Application No. 202110064098.7, titled "DRIVING DEVICE", filed on Jan. 18, 2021 with the China National Intellectual Property Administration, the entire disclosures thereof are incorporated herein by reference.

FIELD

The present application relates to the field of control technology, and in particular to a driving device and a valve.

BACKGROUND

A transmission component is applicable in various devices that require the transmission of torque. By arranging a magnetic element at an output shaft of an electric motor, a rotation angle and a moving state of the output shaft of the electric motor can be determined based on a magnetic field of the magnetic element. Since the magnetic element is generally fragile, a problem to be solved at present is to reduce the damage to the magnetic element when being installed on the shaft or during the operation of the electric motor, so as to improve the qualified product rate and the reliability during use.

SUMMARY

The object of the present application is to reduce a risk of damage to a magnetic element.

A driving device is provided according to an embodiment of the present application. The driving device includes an electric motor and a transmission assembly, an output shaft of the electric motor being connected to the transmission assembly, where the transmission assembly includes a transmission member, the transmission member is fixed to the output shaft or fitted with the output shaft in a limiting manner, and the output shaft is capable of driving the transmission member to rotate; the transmission assembly further includes a magnetic element, and the driving device further includes a Hall element arranged close to the magnetic element; the transmission member includes a cylindrical portion having a first hole passage, and the first hole passage includes a first opening portion provided at an outer wall portion of the cylindrical portion; at least part of the magnetic element extends through the first opening portion into the first hole passage, and the magnetic element is fixed to the cylindrical portion.

A valve is further provided according to an embodiment of the present application. The valve includes a valve core and the driving device, and the transmission assembly is connected to the valve core in a transmission manner.

In the embodiment, the transmission member includes the cylindrical portion having the first hole passage, and at least part of the magnetic element extends through the first opening portion into the first hole passage, which reduces a resultant force on the magnetic element during installation. In addition, the transmission member wraps part of the magnetic element after the magnetic element is installed, thereby reducing a risk of damage to the magnetic element during installation and use.

DETAILED DESCRIPTION OF THE EMBODIMENTS

The embodiments are described in detail hereinafter in conjunction with the accompanying drawings.

Figure 1:
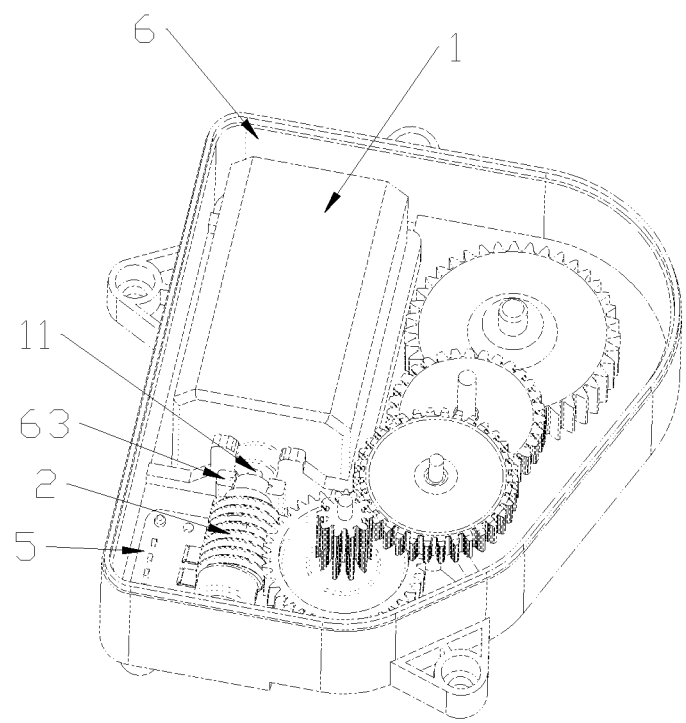
FIG. 1 is a schematic perspective view partially showing the structure of a driving device according to an embodiment of the present application.

As shown in FIG. 1, a driving device includes an electric motor 1 and a transmission assembly. The electric motor 1 includes an output shaft 11, and the output shaft 11 of the electric motor 1 is connected to the transmission assembly. The transmission assembly includes a transmission member 2 fixed to the output shaft 11 or fitted with the output shaft 11 in a limiting manner. For example, the transmission member 2 may be integrally molded with the output shaft 11 or be in an interference fit with the output shaft 11 or fitted with the output shaft 11 in a limiting manner by a key or other connectors. The output shaft 11 is capable of driving the transmission member 2 to rotate, and the transmission assembly may be connected to a valve core of a valve in a transmission manner, to control a rotation angle of the valve core. The driving device further includes a housing 6, and the electric motor 1 is fixed to the housing 6.

Figure 2:
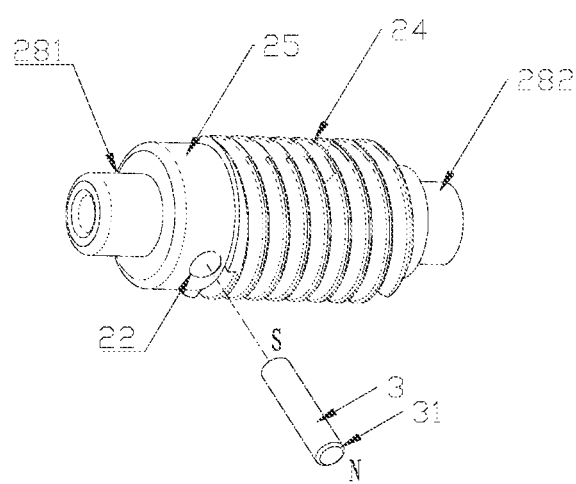
FIG. 2 is a schematic perspective view showing the structure of a part of the driving device shown in FIG. 1.
Figure 3:
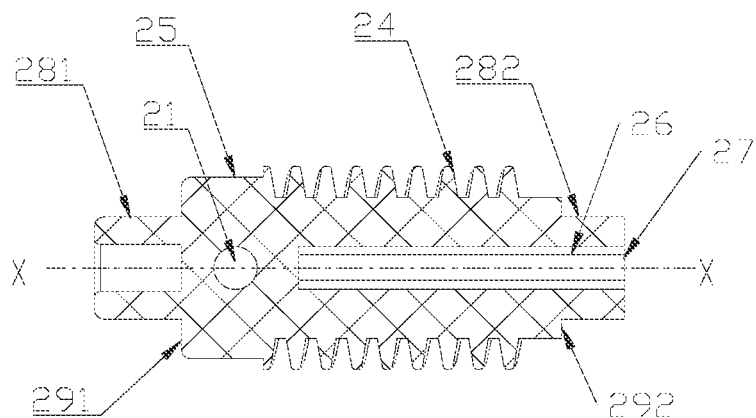
FIG. 3 is a schematic sectional view showing the structure of a transmission member shown in FIG. 2.

As shown in FIGS. 1 to 3, the transmission member 2 includes a cylindrical portion 25 having a first hole passage 21. The first hole passage 21 includes a first opening portion 22 arranged at an outer wall portion of the cylindrical portion 25. The transmission assembly further includes a magnetic element 3, at least part of the magnetic element 3 extends through the first opening portion 22 into the first hole passage 21, and the magnetic element 3 is fixed to the cylindrical portion 25. During installation, the magnetic element 3 may be directly pressed into the first hole passage 21 via the first opening portion 22. After installation, an inner wall portion of the first hole passage 21 may be in an interference fit with an outer wall portion of the magnetic element 3, so that the magnetic element 3 is fixed to the transmission member 2. In other embodiments, the magnetic element 3 may be fixed to the transmission member 2 by injection molding.

In some embodiments, the transmission member 2 is made of a non-ferromagnetic material, for example plastic, so that a magnetic field of the magnetic element 3 is not affected by the transmission member 2. Since the transmission member 2 has hardness less than that of the magnetic element 3, the risk of breaking or damage of the magnetic element 3 in the process that the magnetic element 3 being pressed into the first hole passage 21 can be reduced. In addition, during the pressing, a radial force of the inner wall portion of the first hole passage 21 on the magnetic element 3 is directed from a periphery of the outer wall portion of the magnetic element 3 towards a center of the magnetic element. That is, a resultant force of the inner wall portion of the first hole passage 21 on the magnetic element 3 in the radial direction is relatively small, which reduces the risk of breaking of the magnetic element 3. Compared to a technical solution in which the magnetic element surrounds the output shaft of the electric motor and being in an interference fit with the output shaft of the electric motor, and the magnetic element is exposed at an outer side of the output shaft of the electric motor, in the embodiment of the present application, the risk of breaking of the magnetic element 3 can be reduced by pressing the magnetic element 3 into the first hole passage 21. In the embodiment, the magnetic element 3 is cylindrical and the first hole passage 21 has a circular cross-section to facilitate the insertion of the magnetic element 3 into the transmission member 2.

As shown in FIGS. 1 to 4, the transmission member 2 is axially rotatable around the output shaft 11, with X-X being a center line of rotation of the transmission member 2. A center line of the first hole passage 21 intersects with the center line of rotation X-X of the transmission member 2. In an embodiment, the center line of the first hole passage 21 is perpendicular to the center line of rotation X-X of the transmission member 2, thereby reducing an offset of a center of gravity of the transmission member 2 relative to the center line of rotation X-X. The transmission member 2 may further include a second hole passage 26. A center line of the second hole passage 26 coincides with the center line of rotation of the transmission member 2, and at least part of the output shaft 11 extends into the second hole passage 26.

Figure 5:
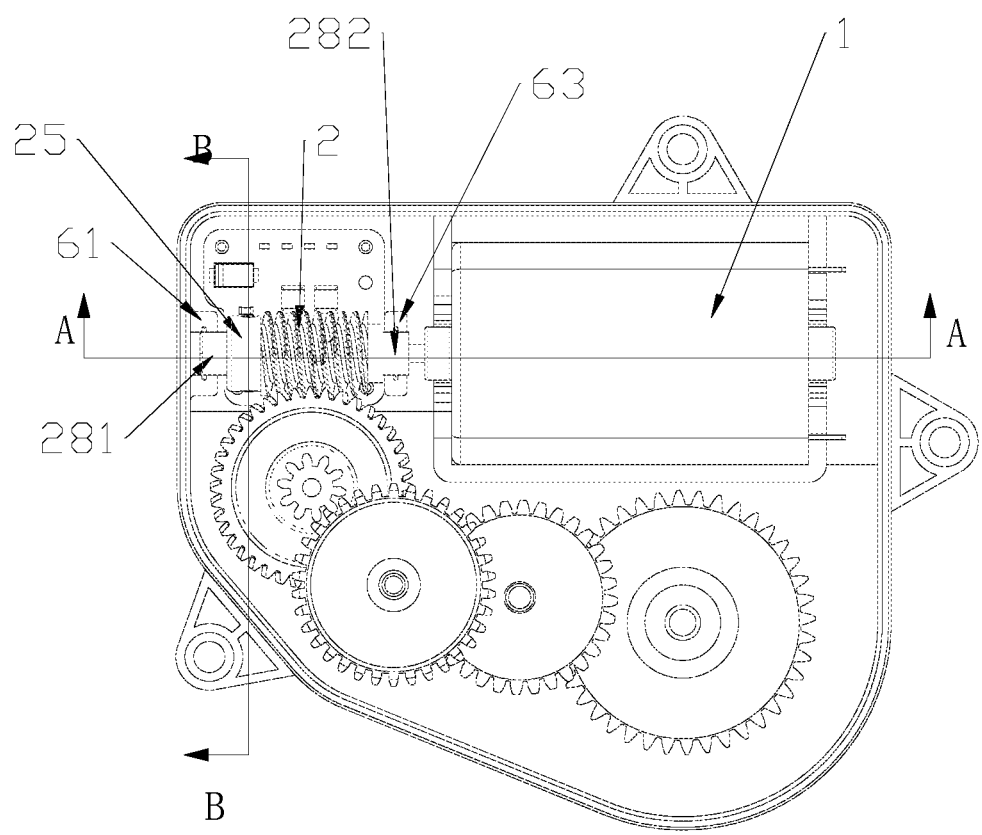
FIG. 5 is a schematic top view showing the structure of the part of the driving device shown in FIG. 4.
Figure 6:
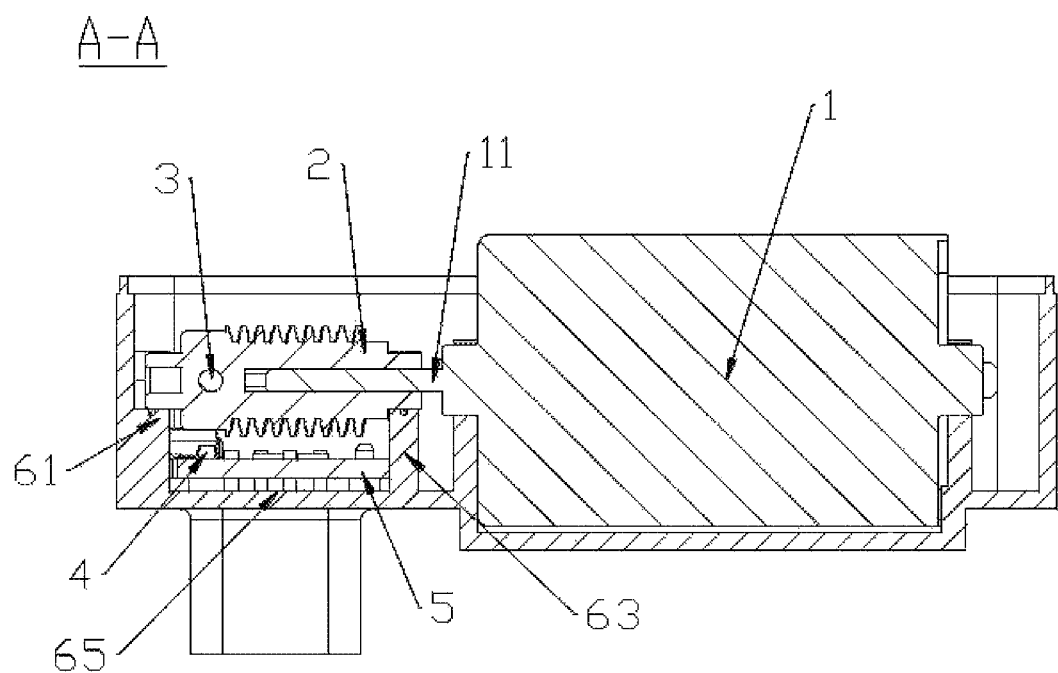
FIG. 6 is a schematic sectional view showing the structure of the driving device shown in FIG. 5 taken along line A-A.
Figure 7:
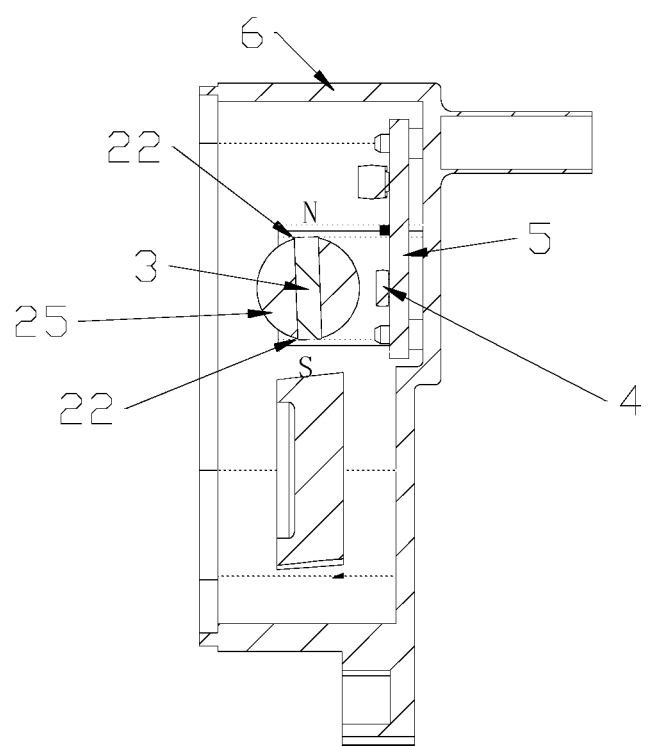
FIG. 7 is a schematic sectional view showing the structure of the driving device shown in FIG. 5 taken along line B-B.

As shown in FIGS. 5 to 7, the magnetic element 3 is bar-shaped, with two axial ends of the magnetic element 3 being a north (N) pole and a south (S) pole respectively. The driving device further includes a circuit board 5 and a Hall element 4 arranged close to the magnetic element 3. The Hall element 4 is fixed to the circuit board 5. When the transmission member 2 rotates, the N pole and the S pole of the magnetic element 3 alternately approach the Hall element 4, and the magnetic field of the magnetic element 3 can be sensed by the Hall element 4. The electric motor 1 may be a direct current motor, and the Hall element 4 is part of a switch-type Hall sensor. The switch-type Hall sensor allows the detected magnetic field to be outputted to a controller as an electrical signal in the form of a square wave, to obtain information such as the number of turns of rotation of the transmission member 2, which facilitates controlling a position of the valve core driven by the driving device. The magnetic element 3 is arranged axially symmetrically with respect to the output shaft 11, that is, the magnetic element 3 is symmetrical about a central axis of the output shaft 11. In a case that the output shaft 11 is arranged coaxially with the rotation axis of the transmission member 2, the magnetic element 3 is arranged axially symmetrically with respect to the rotation axis of the transmission member 2, so that magnetic induction lines outside the transmission member 2 are rotationally symmetrically distributed, which facilitates the Hall sensor generating electrical signals with uniform frequencies and reduces the vibration of the transmission member 2 due to the decentration. The magnetic element 3 may be made of a rare earth permanent material, such as rubidium iron boron, which has a strong magnetic field, and a relatively large hysteresis may be set, to improve the anti-interference capability of the Hall sensor in detection. In the embodiment, only one magnetic element 3 needs to be installed, and the N pole and the S pole of the magnetic element can be used simultaneously, to obtain a relatively large hysteresis, which simplifies the magnetic element 3 and the installation structure thereof while ensuring the anti-interference capability of the Hall element 4. For a general switch-type Hall sensor, the larger the hysteresis of the magnetic field is, the stronger the anti-interference capability of the Hall sensor is. In an embodiment, a minimum distance between the Hall element 4 and the magnetic element 3 is less than or equal to 6 mm, thereby improving the anti-interference capability of the Hall element 4 in detection.

In addition, compared with the magnetic element 3 being arranged at the transmission member indirectly connected to the output shaft 11, with the magnetic element 3 being arranged at the transmission member 2 directly connected to the output shaft 11 of the electric motor 1, the number of turns of rotation of the electric motor 1 is recorded more precisely, thereby improving the precision of control of the position of the valve core by the driving device. In the embodiment, only one magnetic element 3 needs to be installed, and in a case where a transmission ratio of the transmission assembly is greater than or equal to 50, with the detection of the magnetic element 3, which ensures a high precision of control of rotation of the valve core, which can be limited within plus or minus 5 degrees.

As shown in FIG. 2, FIG. 3 and FIG. 6, the transmission member 2 includes a tooth-shaped portion 24, which is coaxially arranged with the cylindrical portion 25, and the tooth-shaped portion 24 and the cylindrical portion 25 are arranged along the axial direction of the transmission member 2. An outer surface of the cylindrical portion 25 is relatively smooth, and the tooth-shaped portion 24 is configured to engage with other gears. The cylindrical portion 25 is arranged away from the output shaft 11 relative to the tooth-shaped portion 24, so that the magnetic element 3 mounted on the cylindrical portion 25 is located relatively away from the output shaft 11, thereby preventing the magnetic element 3 from interfering with the output shaft 11. In an embodiment, the first hole passage 21 is provided with two first opening portions 22, and a length of the magnetic element 3 may be greater than or equal to a length of the first hole passage 21. In this embodiment, most part of the magnetic element 3 is located inside the transmission member 2, so that the transmission member 2 protects the magnetic element 3, thereby reducing the risk of damage to the magnetic element 3.

Figure 8:
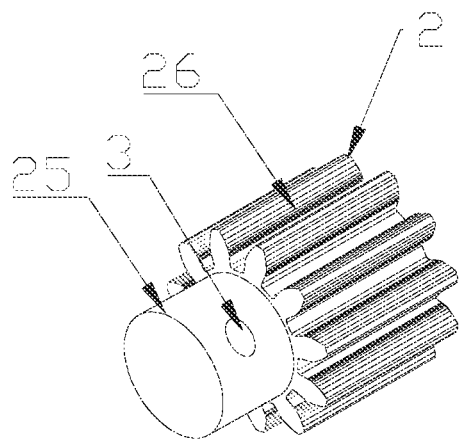
FIG. 8 is a schematic perspective view showing the structure of a transmission assembly according to another embodiment of the present application.

In this embodiment, the tooth-shaped portion 24 is in a form of a worm. In other embodiments, the tooth-shaped portion 24 may be in a form of a straight tooth, an oblique tooth or a conical tooth. In another embodiment of the transmission member, the tooth-shaped portion 24 is in the form of a straight tooth, as shown in FIG. 8.

Figure 9:
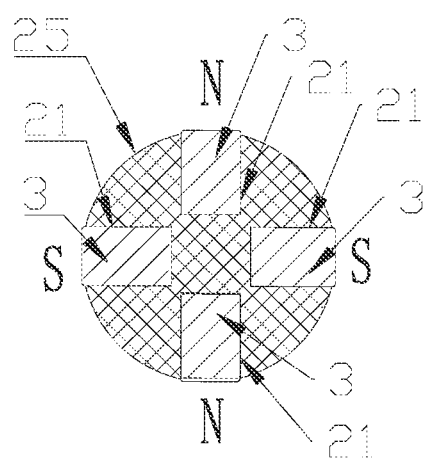
FIG. 9 is a schematic sectional view showing the structure of a transmission assembly according to yet another embodiment of the present application.

In other embodiments, as shown in FIGS. 6 and 9, the number of the magnetic element 3 may be at least two, and the number of the first hole passage 21 may be at least two, the first hole passage 21 is a blind hole passage, the first hole passage 21 is axially symmetrical in the cylindrical portion 25 with respect to the rotation axis of the transmission member 2. In this case, the length of the magnetic element 3 may be greater than or equal to the length of the first hole passage 21, resulting in a closer distance between the magnetic elements 3 and the Hall element 4, thereby increasing the detection precision of a rotation angle of the transmission member 2 by the Hall element 4. As shown in FIG. 9, four magnetic elements 3 are distributed at the transmission member, a center line of the first hole passage 21 intersects with a center line of rotation of the transmission member. For example, the center line of the first hole passage 21 is perpendicular to the center line of rotation of the transmission member, and the magnetic elements 3 are arranged in a manner that the N pole and the S pole are alternately arranged along a peripheral direction of the cylindrical portion 25. In a specific implementation, the number of the magnetic element 3 and the first hole passage 21 may be set according to requirements, for example, there may be two magnetic element 3 and two first hole passages 21; or four magnetic elements 3 and four first hole passages 21; or three magnetic elements 3 and three first hole passages 21, or the like.

As shown in FIGS. 3 and 6, in some embodiments, the transmission member 2 includes a first end face portion 291 and a second end face portion 292 located at two sides in an axial direction. Both the first end face portion 291 and the second end face portion 292 are perpendicular to the output shaft 11, and both the tooth-shaped portion 24 and the cylindrical portion 25 are located between the first end face portion 291 and the second end face portion 292. The first end face portion 291 is located at a side of the cylindrical portion 25 away from the tooth-shaped portion 24 or is an end face portion of the cylindrical portion 25. The second end face portion 292 is located at a side of the tooth-shaped portion 24 away from the cylindrical portion 25 or is an end face portion of the tooth-shaped portion 24. The transmission member 2 includes a first boss portion 281 protruding axially from the first end face portion 291 and a second boss portion 282 protruding axially from the second end face portion 292. Both the first boss portion 281 and the second boss portion 282 extend along the axial direction of the transmission member 2. The first boss portion 281 has a circular cross-section and a diameter smaller than a diameter of the cylindrical portion 25, and the second boss portion 282 has a circular cross-section and a diameter smaller than an outer peripheral diameter of the tooth-shaped portion 24.

Figure 4:
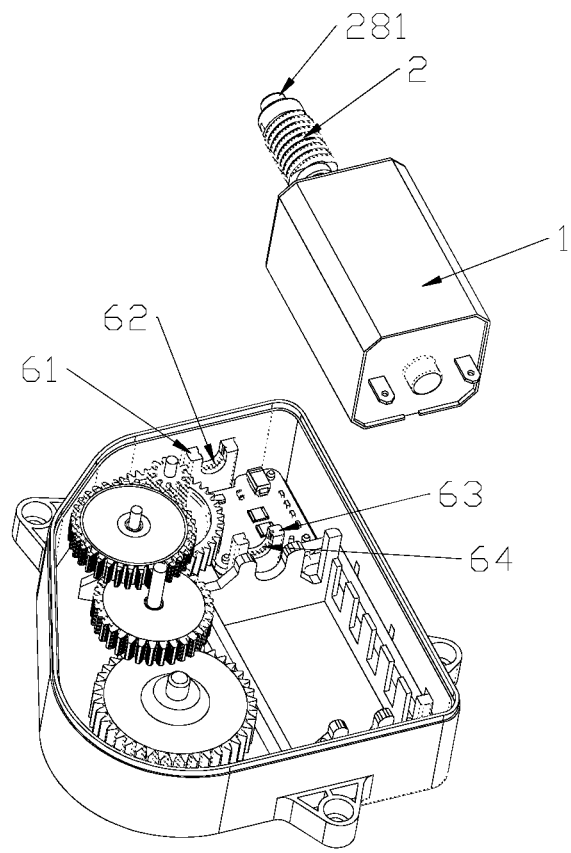
FIG. 4 is an exploded schematic view showing the structure of the part of the driving device shown in FIG. 1.

As shown in FIGS. 4 to 6, the housing 6 includes an inner wall portion 65. The transmission assembly is located at one side of the inner wall portion 65 in a height direction. The housing 6 further includes a first limiting portion 61 and a second limiting portion 63 both protruding from the inner wall portion 65. The first limiting portion 61 has a first recess 62 extending from a top towards an interior of the first limiting portion 61, and the second limiting portion 63 has a second recess 64 extending from a top towards an interior of the second limiting portion 63. The first recess 62 and the second recess 64 each has a circular cross-section. At least part of the first boss portion 281 is located in the first recess 62 and at least part of the second boss portion 282 is located in the second recess 64. An inner wall of the first recess 62 is in a sliding fit with a side wall portion of the first boss portion 281, and an inner wall of the second recess 64 is in a sliding fit with a side wall portion of the second boss portion 282. The first limiting portion 61 and the second limiting portion 62 can support the transmission member 2 in a radial direction, thereby reducing the vibration of the transmission member 2 in the radial direction.

In some embodiments, the axises of both the circuit board 5 and the output shaft 11 are parallel to the inner wall portion 65, the Hall element 4 is located between the cylindrical portion 25 and the inner wall portion 65, and the first limiting portion 61 and the second limiting portion 62 can prevent the transmission member 2 from getting too close to the Hall element 4. Along the axial direction of the output shaft 11, the Hall element 4 is located between the first limiting portion 61 and the second limiting portion 63, which can reduce the occupation of the Hall element 4 in an internal space of the driving device, resulting in a more compact structure of the driving device.

It should be understood that relationship terms such as "first", "second" are used only to distinguish one entity or operation from another and do not necessarily require or imply any such actual relationship or order between these entities or operations. It should be noted that the above embodiments are intended to illustrate the present application only and not to limit the technical solutions described herein. Although the present application is described in detail with reference to the above embodiments in the present specification, it should be understood by those skilled in the art that those skilled in the art may still make modifications or equivalent substitutions to the present application, and that all technical solutions and improvements thereto without departing from the spirit and scope of the present application shall fall within the scope of the claims of the present application.

The invention claimed is:

1. A driving device, comprising an electric motor and a transmission assembly, an output shaft of the electric motor being connected to the transmission assembly, wherein
the transmission assembly comprises a transmission member, the transmission member is fixed to the output shaft or fitted with the output shaft in a limiting manner, and the output shaft is configured to drive the transmission member to rotate;
the transmission assembly further comprises a magnetic element, and the driving device further comprises a Hall element arranged close to the magnetic element;
the transmission member comprises a cylindrical portion having a first hole passage;
the first hole passage comprises a first opening portion provided at an outer wall portion of the cylindrical portion, at least part of the magnetic element extends through the first opening portion into the first hole passage, and the magnetic element is fixed to the cylindrical portion;
hardness of the transmission member is less than hardness of the magnetic element; and
the transmission member further comprises a toothed portion arranged coaxially with the cylindrical portion, the transmission member comprises a second hole passage, a center line of the second hole passage coincides with a center line of rotation of the transmission member, at least part of the output shaft extends into the second hole passage, and the cylindrical portion is arranged away from the output shaft relative to the toothed portion.

2. The driving device as claimed in claim 1, wherein a center line of the first hole passage intersects with the center line of rotation of the transmission member, the first hole passage extends through the cylindrical portion, the number of the first opening portion of the first hole passage is two, and the magnetic element has a length greater than or equal to a length of the first hole passage.

3. The driving device as claimed in claim 2, wherein the magnetic element is arranged axially symmetrically with respect to a rotation axis of the transmission member.

4. The driving device as claimed in claim 2, wherein the transmission member is made of plastic, and the magnetic element is made of rare earth permanent magnet; and an inner wall portion of the first hole passage is in an interference fit with an outer wall portion of the magnetic element.

5. The driving device as claimed in claim 2, wherein the Hall element is arranged to face the outer wall portion of the cylindrical portion, and a minimum distance between the Hall element and the magnetic element is less than or equal to 6 mm.

6. The driving device as claimed in claim 2, wherein the number of the magnetic element of the driving device is one, and the transmission assembly has a transmission ratio greater than or equal to 50.

7. A valve, comprising a valve core and the driving device as claimed in claim 2, wherein the transmission assembly is connected to the valve core in a transmission manner.

8. The driving device as claimed in claim 1, wherein a center line of the first hole passage intersects with the center line of rotation of the transmission member, the number of the first hole passage is at least two, the first hole passage is a blind hole, the first hole passage is axially symmetrical in the cylindrical portion with respect to a rotation axis of the transmission member, and the magnetic element has a length greater than or equal to a length of the first hole passage.

9. The driving device as claimed in claim 1, wherein the magnetic element is bar-shaped, an N pole and an S pole of the magnetic element are respectively located at two axial ends of the magnetic element, and the first hole passage has a circular cross-section.

10. The driving device as claimed in claim 1, wherein the transmission member is made of plastic, and the magnetic element is made of rare earth permanent magnet; and an inner wall portion of the first hole passage is in an interference fit with an outer wall portion of the magnetic element.

11. The driving device as claimed in claim 1, wherein the toothed portion is in a form of straight teeth or in a form of a worm.

12. The driving device as claimed in claim 1, wherein the transmission member comprises a first end face portion and a second end face portion located at two sides in an axial direction, the first end face portion is located at a side of the cylindrical portion away from the toothed portion, and the second end face portion is located at a side of the toothed portion away from the cylindrical portion; and the transmission member comprises a first boss portion protruding axially from the first end face portion and a second boss portion protruding axially from the second end face portion, the first boss portion has a circular cross-section and a diameter smaller than a diameter of the cylindrical portion, and the second boss portion has a circular cross-section and a diameter smaller than a diameter of the toothed portion.

13. The driving device as claimed in claim 12, wherein the driving device further comprises a housing to which the electric motor is fixed, the housing comprises an inner wall portion and further comprises a first limiting portion and a second limiting portion both protruding from the inner wall portion, the first limiting portion has a first recess and the second limiting portion has a second recess, and an inner wall of the first recess is in a sliding fit with a side wall portion of the first boss portion, and an inner wall of the second recess is in a sliding fit with a side wall portion of the second boss portion.

14. The driving device as claimed in claim 13, wherein the driving device further comprises a circuit board, the Hall element is fixed to the circuit board, the Hall element is located between the first limiting portion and the second limiting portion, the circuit board and the output shaft each is parallel to the inner wall portion, and the Hall element is located between the cylindrical portion and the inner wall portion.

15. The driving device as claimed in claim 1, wherein the Hall element is arranged to face the outer wall portion of the cylindrical portion, and a minimum distance between the Hall element and the magnetic element is less than or equal to 6 mm.

16. The driving device as claimed in claim 1, wherein the driving device comprises a switch-type Hall sensor, and the switch-type Hall sensor comprises the Hall element.

17. The driving device as claimed in claim 1, wherein the number of the magnetic element of the driving device is one, and the transmission assembly has a transmission ratio greater than or equal to 50.

18. A valve, comprising a valve core and the driving device as claimed in claim 1, wherein the transmission assembly is connected to the valve core in a transmission manner.

* * * * *